United States Patent
Wolfram et al.

(10) Patent No.: US 9,213,768 B1
(45) Date of Patent: *Dec. 15, 2015

(54) ASSUMPTION MECHANISM FOR QUERIES

(75) Inventors: Stephen Wolfram, Champaign, IL (US); Oyvind Tafjord, Eugene, OR (US)

(73) Assignee: WOLFRAM ALPHA LLC, Champaign, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/780,685

(22) Filed: May 14, 2010

Related U.S. Application Data

(60) Provisional application No. 61/178,853, filed on May 15, 2009.

(51) Int. Cl.
*G06F 17/30* (2006.01)

(52) U.S. Cl.
CPC .... *G06F 17/30867* (2013.01); *G06F 17/30424* (2013.01)

(58) Field of Classification Search
CPC .............. G06F 17/30867; G06F 17/30424; G06F 17/30654; G06F 17/30973
USPC .............. 707/723, 713, 736, 769, 779
See application file for complete search history.

(56) References Cited

U.S. PATENT DOCUMENTS

| | | | |
|---|---|---|---|
| 4,734,854 A | 3/1988 | Afshar | |
| 4,740,886 A | 4/1988 | Tanifuji et al. | |
| 4,841,441 A | 6/1989 | Nixon et al. | |
| 4,949,253 A | 8/1990 | Chigira et al. | |
| 5,038,296 A | 8/1991 | Sano | |
| 5,315,710 A | 5/1994 | Kishimoto et al. | |
| 5,394,509 A | 2/1995 | Winston | |
| 5,434,777 A * | 7/1995 | Luciw | 704/9 |
| 5,448,740 A | 9/1995 | Kiri et al. | |
| 5,485,601 A | 1/1996 | Ching | |
| 5,499,371 A | 3/1996 | Henninger et al. | |
| 5,555,367 A | 9/1996 | Premerlani et al. | |
| 5,559,939 A | 9/1996 | Wada et al. | |
| 5,634,024 A | 5/1997 | Yamaguchi | |

(Continued)

FOREIGN PATENT DOCUMENTS

| | | |
|---|---|---|
| EP | 0 442 240 A2 | 8/1991 |
| WO | WO-97/40425 A2 | 10/1997 |

(Continued)

OTHER PUBLICATIONS

Office Action for related U.S. Appl. No. 12/780,705, dated Jan. 31, 2012.

(Continued)

*Primary Examiner* — Shiow-Jy Fan

(57) ABSTRACT

A word meaning or sense is determined in response to an actual user query in a system designed for computation, search, or other activities involving the processing of queries. Assumptions, which are attempts to disambiguate pieces of the user's query string, are generated. Generation of the assumptions is based on various heuristics and algorithms which are designed to disambiguate words which may connote multiple different entities, meanings, or senses given the context. Assumptions also may be ranked based on a set of criteria that does not require an elaborately constructed body of world knowledge to be created. A most likely assumption may be chosen for generating a machine-generated query and/or for generating query results.

26 Claims, 9 Drawing Sheets

(56) References Cited

U.S. PATENT DOCUMENTS

| | | | |
|---|---|---|---|
| 5,640,576 A | 6/1997 | Kobayashi et al. | |
| 5,696,962 A | 12/1997 | Kupiec | |
| 5,768,590 A | 6/1998 | Kimura et al. | |
| 5,815,713 A | 9/1998 | Sanders | |
| 5,815,717 A | 9/1998 | Stack | |
| 5,987,505 A | 11/1999 | Fry et al. | |
| 6,038,560 A | 3/2000 | Wical | |
| 6,076,051 A | 6/2000 | Messerly et al. | |
| 6,084,585 A | 7/2000 | Kraft et al. | |
| 6,144,989 A | 11/2000 | Hodjat et al. | |
| 6,169,986 B1 | 1/2001 | Bowman et al. | |
| 6,173,441 B1 | 1/2001 | Klein | |
| 6,216,139 B1 | 4/2001 | Listou | |
| 6,256,665 B1 | 7/2001 | Fry et al. | |
| 6,275,976 B1 | 8/2001 | Scandura | |
| 6,289,513 B1 | 9/2001 | Bentwich | |
| 6,493,694 B1 | 12/2002 | Xu et al. | |
| 6,502,236 B1 | 12/2002 | Allen et al. | |
| 6,505,157 B1 | 1/2003 | Elworthy | |
| 6,519,585 B1* | 2/2003 | Kohli | 1/1 |
| 6,584,464 B1 | 6/2003 | Warthen | |
| 6,589,290 B1 | 7/2003 | Maxwell et al. | |
| 6,675,159 B1 | 1/2004 | Lin et al. | |
| 6,684,388 B1 | 1/2004 | Gupta et al. | |
| 6,704,728 B1* | 3/2004 | Chang et al. | 1/1 |
| 6,742,162 B2 | 5/2004 | Bennett | |
| 6,845,354 B1* | 1/2005 | Kuo et al. | 704/9 |
| 6,876,314 B1 | 4/2005 | Lin | |
| 6,877,155 B1 | 4/2005 | Lindsey | |
| 6,901,399 B1 | 5/2005 | Corston et al. | |
| 6,973,640 B2 | 12/2005 | Little et al. | |
| 6,996,801 B2 | 2/2006 | Yoneyama | |
| 7,120,574 B2 | 10/2006 | Troyanova et al. | |
| 7,137,100 B2 | 11/2006 | Iborra et al. | |
| 7,197,739 B2 | 3/2007 | Preston et al. | |
| 7,222,333 B1 | 5/2007 | Mor et al. | |
| 7,231,343 B1 | 6/2007 | Treadgold et al. | |
| 7,263,517 B2 | 8/2007 | Sheu et al. | |
| 7,269,822 B2 | 9/2007 | Gebhart et al. | |
| 7,373,291 B2 | 5/2008 | Garst | |
| 7,403,938 B2 | 7/2008 | Harrison et al. | |
| 7,440,968 B1 | 10/2008 | Oztekin et al. | |
| 7,451,135 B2 | 11/2008 | Goldman et al. | |
| 7,454,701 B2 | 11/2008 | Graeber | |
| 7,613,676 B2 | 11/2009 | Baisley et al. | |
| 7,620,935 B2 | 11/2009 | Baisley et al. | |
| 7,685,507 B2 | 3/2010 | Workman et al. | |
| 7,747,601 B2 | 6/2010 | Cooper et al. | |
| 7,844,594 B1 | 11/2010 | Holt et al. | |
| 7,870,147 B2 | 1/2011 | Bailey et al. | |
| 7,895,221 B2 | 2/2011 | Colledge et al. | |
| 8,091,024 B2 | 1/2012 | Graeber | |
| 8,135,696 B2 | 3/2012 | Safoutin | |
| 8,185,523 B2 | 5/2012 | Lu et al. | |
| 2002/0099743 A1 | 7/2002 | Workman et al. | |
| 2002/0116176 A1 | 8/2002 | Tsourikov et al. | |
| 2002/0140734 A1 | 10/2002 | Bennett | |
| 2002/0143810 A1 | 10/2002 | Bennett | |
| 2002/0174120 A1 | 11/2002 | Zhang et al. | |
| 2002/0188586 A1* | 12/2002 | Veale | 707/1 |
| 2003/0145022 A1 | 7/2003 | Dingley | |
| 2003/0191765 A1 | 10/2003 | Bargh et al. | |
| 2004/0001109 A1 | 1/2004 | Blancett et al. | |
| 2004/0049499 A1 | 3/2004 | Nomoto et al. | |
| 2004/0088158 A1 | 5/2004 | Sheu et al. | |
| 2004/0103405 A1 | 5/2004 | Vargas | |
| 2004/0128649 A1 | 7/2004 | Grundy et al. | |
| 2005/0005258 A1 | 1/2005 | Bhogal et al. | |
| 2005/0080780 A1* | 4/2005 | Colledge et al. | 707/4 |
| 2005/0097464 A1 | 5/2005 | Graeber | |
| 2006/0020886 A1 | 1/2006 | Agrawal et al. | |
| 2006/0025987 A1 | 2/2006 | Baisley et al. | |
| 2006/0026576 A1 | 2/2006 | Baisley et al. | |
| 2006/0136411 A1 | 6/2006 | Meyerzon et al. | |
| 2006/0190439 A1 | 8/2006 | Chowdhury et al. | |
| 2006/0271908 A1 | 11/2006 | Bargh et al. | |
| 2006/0279799 A1 | 12/2006 | Goldman | |
| 2007/0022109 A1 | 1/2007 | Imielinski et al. | |
| 2007/0043574 A1 | 2/2007 | Coffman et al. | |
| 2007/0106657 A1* | 5/2007 | Brzeski et al. | 707/5 |
| 2007/0106659 A1 | 5/2007 | Lu et al. | |
| 2007/0156516 A1* | 7/2007 | Moissinac et al. | 705/14 |
| 2007/0203929 A1 | 8/2007 | Bolivar | |
| 2007/0208722 A1* | 9/2007 | Dettinger et al. | 707/4 |
| 2007/0220034 A1 | 9/2007 | Iyer et al. | |
| 2007/0282811 A1* | 12/2007 | Musgrove | 707/3 |
| 2008/0016040 A1* | 1/2008 | Jones et al. | 707/3 |
| 2008/0066052 A1 | 3/2008 | Wolfram | |
| 2008/0082501 A1* | 4/2008 | Hardy | 707/3 |
| 2009/0055733 A1 | 2/2009 | Graeber | |
| 2009/0171923 A1 | 7/2009 | Nash et al. | |
| 2010/0004924 A1 | 1/2010 | Paez | |
| 2010/0191740 A1 | 7/2010 | Lu et al. | |
| 2010/0205198 A1 | 8/2010 | Mishne et al. | |
| 2010/0293174 A1 | 11/2010 | Bennett et al. | |

FOREIGN PATENT DOCUMENTS

| | | |
|---|---|---|
| WO | WO-2006/014892 A2 | 2/2006 |
| WO | WO-2006/015006 A2 | 2/2006 |

OTHER PUBLICATIONS

"AppleScript," Wikipedia.
"Area calculator", http://www.calculator.com, 1 page, Aug. 15, 2006.
"calculator.com", http://www.calculator.com, 2 pages, Aug. 15, 2006.
"Car Lease Calculator", http://www.calculator.com, 1 page, Aug. 15, 2006.
"Currency Calculator", http://www.calculator.com, 1 page, Aug. 15, 2006.
"Fractions calculator", http://www.calculator.com, 1 page, Aug. 15, 2006.
"General Loan Calculator", http://www.calculator.com, 1 page, Aug. 15, 2006.
"Google Code," <http://code.google.com/>, Mar. 17, 2005, p. 1-11.
"Graphing calculator", http://www.calculator.com, 1 page, Aug. 15, 2006.
"Home—Finance", http://www.calculator.com, 2 page, Aug. 15, 2006.
"Home Equity Calculator", http://www.calculator.com, 1 page, Aug. 15, 2006.
"How Much Can I Afford Calculator", http://www.calculator.com, 1 page, Aug. 15, 2006.
"Length Adding Calculator", http://www.calculator.com, 1 page, Aug. 15, 2006.
"Love Calculator", http://www.calculator.com, 1 page, Aug. 15, 2006.
"Microsoft Computer Dictionary," Microsoft Press, 5th ed., p. 452 (2002).
"Mortgage Payment Calculator", http://www.calculator.com, 1 page, Aug. 15, 2006.
"Mortgage Qualification Calculator", http://www.calculator.com, 1 page, Aug. 15, 2006.
"Percent calculator", http://www.calculator.com, 1 page, Aug. 15, 2006.
"Rent versus Buy Calculator", http://www.calculator.com, 1 page, Aug. 15, 2006.
"Scientific calculator", http://www.calculator.com, 1 page, Aug. 15, 2006.
"Standard calculator", http://www.calculator.com, 1 page, Aug. 15, 2006.
"Temperature calculator", http://www.calculator.com, 1 page, Aug. 15, 2006.
"The Mortgage Calculator," <http://www.hughchou.org/calc/mortold.html>, Aug. 8, 1996, p. 1-7.
"Time Calculator", http://www.calculator.com, 1 page, Aug. 15, 2006.
"Unit Conversion Calculator", http://www.calculator.com, 1 page, Aug. 15, 2006.

(56) References Cited

OTHER PUBLICATIONS

Adorni, et al., "Natural Language Input for Scene Generation," Proceedings of the first conference on European Chapter of the Association for Computational Linguistics, pp. 175-182 (1983).

Asperti et al., "A content based mathematical search engine: Whelp," 2004, p. 1-15.

Estival et al., "Towards Ontology-Based Natural Language Processing," http://acl.ldc.upenn.edu/acl2004/nlpxml/pdf/estival-etal.pdf, accessed Mar. 8, 2010, 8 pages.

Jones et al., "Generating Query Substitutions," ACM WWW 2006, May 23-26, 2006, pp. 387-396.

Kamareddine et al., "Restoring Natural Language as a Computerized Mathematics Input Method," Proceedings of the 14th symposium on Towards Mechanized +Mathematical Assistants: 6th International Conference, pp. 280-295 (2007).

Ko et al., "The State of the Art in End-User Software Engineering," accepted for publication in ACM Computing Surveys.

Lavrov, "Program Synthesis," Cybernetics and Systems Analysis, vol. 18, No. 6 pp. 708-715 (Nov. 1982).

Meyers, A., "VOX—An Extensible Natural Language Processor," http://dli.iiit.ac.in/ijcai/IJCA1-85-VOL2/PDF/026.pdf, accessed Mar. 8, 2010, 5 pages.

Moore, Gregory M., "Calculator Code: Programming Code for Use within a Scientific Calculator," Fall 2005, p. 1-29.

Myers et al., "Natural Programming Languages and Environments," Communications of the ACM, vol. 47, No. 9, pp. 47-52 (Sep. 2004).

Office Action for related U.S. Appl. No. 12/780,685, dated Feb. 15, 2012.

Osogami, "A Study of Input and Output Conditions for Automatic Program Generation," Memoirs of the Fukui Institute of Technology, vol. 37 pp. 273-278 (2007).

Sucan, Ioan Alexandru, "A Search Engine for Mathematical Formulae," May 7, 2006, p. 1-17.

Trott, Michael, "Mathematical Searching of the Wolfram Functions Site," 2005, The Mathematica Journal, p. 713-726.

Trott, Michael, "The Functions Website," 2003, The Mathematica Journal, p. 1-10.

Wang et al., "Mining Term Association Patterns from Search Logs for Effective Query Reformulation," ACM CIKM 2008, Oct. 26-30, 2008, pp. 479-488.

\* cited by examiner

ASSUMPTION MECHANISM FOR QUERIES

CROSS-REFERENCE TO RELATED APPLICATION

This application claims the benefit of U.S. Provisional Patent Application No. 61/178,853, entitled "Assumption Mechanism for Queries," which was filed on May 15, 2009, the entire disclosure of which is hereby incorporated by reference herein.

BACKGROUND

Search engines, such as Internet search engines, have been in use for some time. Such search engines permit the user to form a search query using combinations of keywords to search through a web page database containing text indices associated with one or more distinct web pages. The search engine looks for matches between the search query and text indices in the web page database, and then returns a number of hits which correspond to URL pointers and text excerpts from the web pages that represent the closest matches.

Some Internet search engines attempt to detect when a user has entered a query incorrectly. For example, the Google™ search engine employs a "Did you mean . . . ?" feature that essentially runs a spellchecker on user queries. The spellchecker attempts to detect when an entered word is misspelled by checking it against a database of common words and their misspellings. When a possible misspelling is detected, the search engine may provide to the user a prompt to invoke an alternative query in which the misspelled word is spelled correctly.

Some search engines utilize natural language processing (NLP) techniques. Word sense disambiguation, the process of identifying which sense of a word is used in any given sentence, is a common challenge in any semantic NLP system.

Several NLP systems deal with disambiguation by consulting a comprehensive body of world knowledge. This is done through hierarchies or ontologies, as well as many simple factual statements about the world. Entities are defined in relation to other entities, and semantic maps are created which assist in disambiguating words based on the context in which those words are used. The problem with this approach is that a successful disambiguation requires gigantic ontologies and relational maps that require a huge amount of effort and time to put together. Even the most successful efforts to date have fallen short of a human-like capacity to disambiguate based on context.

SUMMARY OF THE DISCLOSURE

Figure 1:
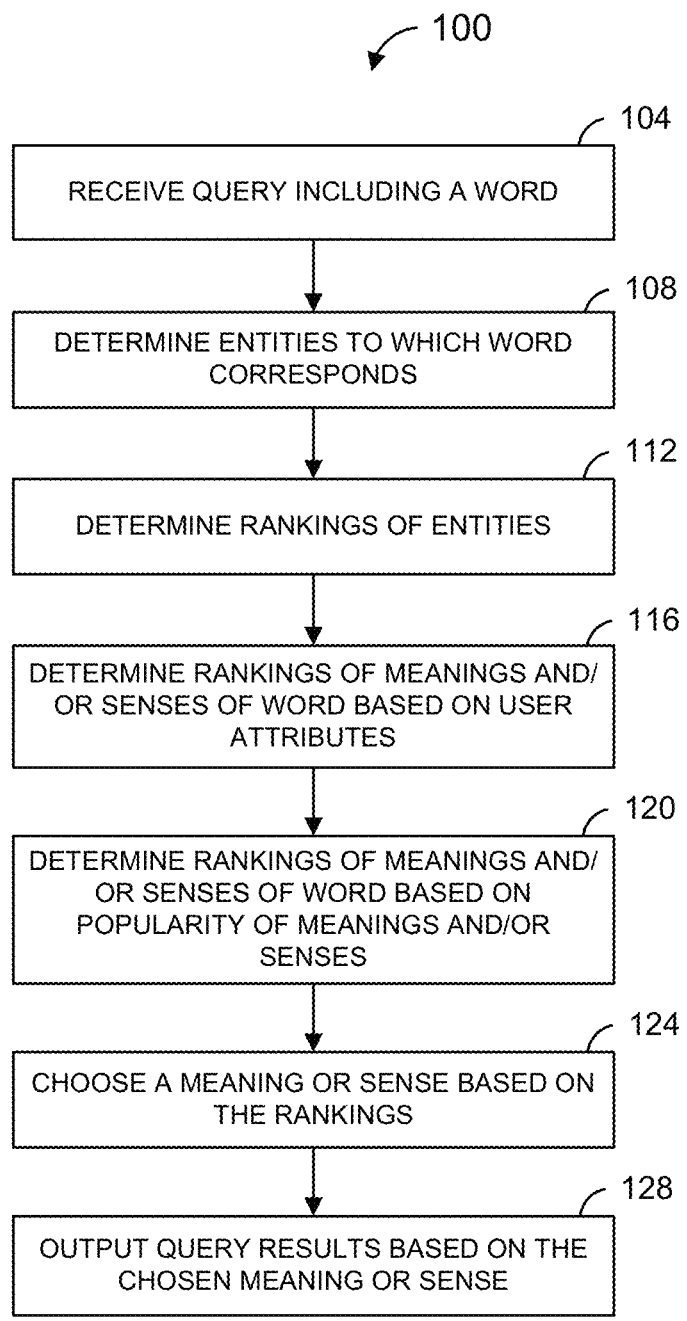
FIG. 1 is a flow diagram of an example method for generating query results when a query includes a word that has multiple meanings, has multiple senses, and/or corresponds to multiple entities.

In one embodiment, a method includes receiving a query that includes a word having multiple meanings, having multiple senses, and/or that corresponds to multiple entities, and if the word refers to multiple entities, determining the entities to which the word corresponds. The method also includes ranking entities to which the word corresponds and which are in a same category using a common set of criteria if the word refers to multiple entities; and ranking the multiple meanings or senses of the word based on attributes of a user if the word has multiple meanings or senses. Additionally, the method includes ranking one or more meanings or senses of the word based on a measure of popularity of the one or more meanings or senses if the word has multiple meanings or senses; and choosing one meaning or sense based on the rankings. The method further includes generating a new query based on the one meaning and/or returning query results based on the one meaning or sense.

In another embodiment, a tangible storage medium having stored thereon machine executable instructions is provided. The machine executable instructions, when executed by one or machines, are for receiving a query that includes a word having multiple meanings, having multiple senses, and/or that corresponds to multiple entities, and determining the entities to which the word corresponds if the word refers to multiple entities. Additionally, the machine executable instructions, when executed by one or machines, are for ranking entities to which the word corresponds and which are in a same category using a common set of criteria if the word refers to multiple entities, and ranking the multiple meanings or senses of the word based on attributes of a user if the word has multiple meanings or senses. Also, the machine executable instructions, when executed by one or machines, are for ranking one or more meanings or senses of the word based on a measure of popularity of the one or more meanings or senses if the word has multiple meanings or senses, and choosing one meaning or sense based on the rankings. Further, the machine executable instructions, when executed by one or machines, are for generating a new query based on the one meaning and/or returning query results based on the one meaning or sense.

In yet another embodiment, a method includes transmitting, via a network, a query in an imprecise syntax, the query including a word having multiple meanings or senses, and receiving, via the network, query results that are based a first meaning or sense of the word. The method additionally includes receiving, via the network, an indication of the first meaning or sense of the word, and receiving, via the network, a user interface mechanism to permit selection of another meaning or sense from a set of one or more meanings or senses different than the first meaning or sense. Also, the method includes displaying the query results, the indication of the first meaning or sense of the word, and the user interface mechanism to permit selection of another meaning or sense on a display device.

In still another embodiment, a tangible storage medium having stored thereon machine executable instructions is provided. The machine executable instructions, when executed by one or machines, are for causing a query in an imprecise syntax, the query including a word having multiple meanings or senses, to be transmitted via a network, and receiving query results that are based on a first meaning or sense of the word in response to the query. Additionally, the machine executable instructions, when executed by one or machines, are for receiving an indication of the first meaning or sense of the word in response to the query, and receiving a user interface mechanism to permit selection of another meaning or sense from a set of one or more meanings or senses different than the first meaning or sense in response to the query. Also, the machine executable instructions, when executed by one or machines, are for causing the query results, the indication of the first meaning or sense of the word, and the user interface mechanism to be displayed on a display device.

In yet another embodiment, a method includes receiving a query in an imprecise syntax, the query including a word, phrase, or group of textual characters, and determining a plurality of meanings or senses of the word, phrase, or group of textual characters. The method additionally includes choosing one meaning or sense, and generating an answer to the query based on the one meaning or sense. The method also includes providing a user interface mechanism to permit a user to select a different one of the plurality of meanings or senses, and receiving an indication of a selected different meaning or sense selected by the user using the user interface mechanism. The method further includes generating a different answer based on the selected different meaning or sense.

In still another embodiment, a tangible storage medium having stored thereon machine executable instructions is provided. The machine executable instructions, when executed by one or machines, are for receiving a query in an imprecise syntax, the query including a word, phrase, or group of textual characters, and determining a plurality of meanings or senses of the word, phrase, or group of textual characters. Additionally, the machine executable instructions, when executed by one or machines, are for choosing one meaning or sense, and generating an answer to the query based on the one meaning or sense. Also, the machine executable instructions, when executed by one or machines, are for providing a user interface mechanism to permit a user to select a different one of the plurality of meanings or senses, and receiving an indication of a selected different meaning or sense selected by the user using the user interface mechanism. Further, the machine executable instructions, when executed by one or machines, are for generating a different answer based on the selected different meaning or sense.

DETAILED DESCRIPTION

Embodiments described herein generally relate to determining a word sense in response to an actual user query in a system designed for computation, search, or other activities involving the processing of queries. Assumptions, which are attempts to disambiguate pieces of the user's query string, are generated. Generation of the assumptions is based on various heuristics and algorithms which are designed to disambiguate words which may connote multiple different entities or senses given the context. Assumptions also may be ranked based on a set of criteria that does not require an elaborately constructed body of world knowledge to be created. A most likely assumption may be chosen for generating a machine-generated query or for retrieving query results. Indications of other generated assumptions may be sent to or displayed to a user. The indications of other generated assumptions may be ranked. If displayed, the indications of other generated assumptions may include links that, when selected, cause a new machine-made query to be submitted and/or that cause query results generated based on the selected assumption to be provided to the user.

Embodiments described herein may be utilized in a system for parsing queries from users and generating answer outputs. In such a system, there may be instances in which a submitted query includes a word that has multiple senses and/or may refer to multiple entities. In such a situation, a plurality of assumptions for the word may be made, and one of the assumptions may be utilized to generate a machine-made query and/or to return results for the user query.

FIG. 1 is a flow diagram of an example method 100 for generating query results when a query includes a word that has multiple meanings, has multiple senses, and/or corresponds to multiple entities. The method 100 thus may be utilized in a in a system designed for computation, search, or other activities involving the processing of queries.

The method 100 could be implemented, at least partially, by a server system in conjunction with a website, for example. In this context, a user could access the website using a browser running on a personal computer, cell phone, personal digital assistant (PDA), etc., for example, and could utilize the website to obtain information. It will be understood, however, that the method 100 could also be used in other contexts. For example, the method 100 could be implemented, at least partially, as part of a "Help" system or other query-based system of a software application such as a computational tool. In such a context, the user could use the query-based system to obtain information.

At block 104, a query is received, such as a query provided by a user. For example, the query may be received via website, via a computational tool, via a software application executed on a computer, etc. The query may include a word that has multiple meanings, has multiple senses, and/or corresponds to multiple entities. In one embodiment, the query is a query in an imprecise syntax. A query in an imprecise syntax is in contrast to a typical computer programming language or database query syntax, in which exact spelling, exact placement of punctuation, exact placement of parentheses, etc., is necessary to specify a particular query or statement. Similarly, with typical computer programming language or database query syntax, a slight change in punctuation, for example, could specify a completely different query or statement, or could render a computer language or database query statement meaningless to a compiler or database. On the other hand, with a query in an imprecise syntax, the query can be expressed using language and terms that may be readily understandable to a human, but unintelligible to a computer program such as a compiler or database interface. Additionally, with a query in an imprecise syntax, many different variations of language and terms and groupings of language and terms may correspond to one query. Further, terms and groupings of terms in the query may be ambiguous, i.e., can have multiple meanings or senses.

At block 108, entities that correspond to the word may be determined. For example, an entities database may be queried with the word. The entities database may include categorized entities such as geographical entities, people, companies, etc. The entities database optionally may include attributes of the entities. Query results from the entities database may include an entity as well as an indication of a category to which the entity belongs. Optionally, the query results from the entities database may include attributes corresponding to the entity.

At block 112, rankings of the entities determined at block 108 may be determined based on attributes of the entities. In one embodiment, entities in a same category will have a common set of attributes, and different categories may have different sets of attributes. For example, one category may be cities, and example attributes for the cities category may include one or more of population, area, etc. Another example of a category may be movies, and example attributes for the movies category may include one or more of box office gross, how recently it was released, etc. Yet another example of a category may be universities, and example attributes for the universities category may include one or more of enrollment numbers, a rank number in a well known published survey, etc.

Rankings may be determined based on these attributes. For example the word "Manhattan" may refer, among other things, to either "Manhattan, New York" or "Manhattan, Illinois." Manhattan, N.Y. will be ranked higher than Manhattan, Ill. with respect to the attribute population. In this way, like entities may be compared based on common criteria, and one will rank higher than the other. The attributes utilized to determine the rankings at block 112 may be retrieved from the entities database or from some other database, for example.

At block 116, rankings of meanings and/or senses of the word may be determined based on user attributes. At least some of the meanings/senses may correspond to the entities determined at block 108. The attributes of the user may be determined in a variety of ways. In a website implementation, user information may be obtained from observing user browsing activity, cookies, etc., while the user interacts with the website. It may be gathered and used on the fly, rather than pre-generated. Such information may include an indication of the user's geographical location, or GeoIP location. The GeoIP location, in turn, yields information such as the time zone the user is in, the currency of the user's country, and the dominant language spoken in the user's area. The user's location may be used to judge distances or likelihoods that entities will be familiar or foreign to that user. For example, the term "Independence Day" in a user's query may refer to any of a hundred Independence Days throughout the world. But rankings of the different Independence Days may be generated based on the user's geographical location. For example, if the user is located in the United States, the sense of "Independence Day" referring to July 4 may be ranked high.

Continuing with this example, if the user's country does not have an Independence Day, then another country that does may be logically linked to or associated with the user's country. For instance, San Marino does not have an Independence Day, but it is a landlocked enclave which is completely surrounded by Italy, which does have an Independence Day. Such hard-coded relationships between entities also may be used to further disambiguate words.

Disambiguating certain formatting conventions of queries, such as the preferred date format, can depend on the user's GeoIP location as well. While Europe uses a day/month format, the United States uses a month/day format. The user's location may thus provide information so that one date format may be ranked higher than another.

In one embodiment, customized user attribute information may be used. If the user chooses different entities than the default assumption, then a profile may develop linking the user to those choices. By this method, the system can learn and remember which specific assumptions to make to a particular user. In another embodiment, a user may voluntarily supply attributes in response to prompts, for example. For example, may choose to maintain a profile with a website.

At block 120, rankings of meanings and/or senses of the word may be determined based on popularities of the different meanings and/or senses. In one embodiment, levels of popularity may be indicated by an index, which may be referred to as a "fame index." The fame index generally may be a measure of how famous or popular an entity is, and the fame index may be generated in a variety of ways. For example, the fame index may be generated based on a number of semantically-rich references to the entity in an information repository, such as an online encyclopedia. The number of links to an encyclopedic entry may be a factor in determining a fame index for an entity corresponding to the encyclopedic entry. An online encyclopedia may contain semantic examples of entities that provide definition and context. Search engines, in comparison, often may not contain useful semantic data about entities. Searching for the physicist Einstein using a typical search engine, for example, will return many results, but some may be referring to another Einstein, or a company with Einstein in the name. Looking at links to an online encyclopedia, or another source of semantic data, may increase chances that an assumption regarding the meaning or sense of a word is correct.

Other techniques may be utilized to generate the fame index. For example, the fame index may be generated based on monitoring aggregate user activity on system that provides search and/or query services, such as a website. The fame index may be based on information such as how often the entity is searched, how often web pages referring to the entity are selected from search results, etc.

In one embodiment, popularities of the entities, different meanings and/or senses of words (e.g., the fame index) may be pre-generated and stored in a database. In this embodiment, the popularities optionally may be updated over time. In another embodiment, popularities of the different meanings and/or senses of words (e.g., the fame index) may be determined in response to a user query, for example.

At block 124, one of the possible meanings or senses of the word may be chosen based on the rankings generated at blocks 112, 116, 120. For example, a formula may be applied to the rankings for all of the possible meanings and/or senses to generate an overall ranking of the possible meanings and/or senses. Then, the top-ranked meaning/sense may be chosen. At least some of the meanings/senses may correspond to the entities determined at block 108.

At block 128, query results may be returned corresponding to the query received at block 104 and utilizing the meaning/sense chosen at block 124. Block 128 may comprise generating a new query that is based on the query received at block 104 and utilizing the meaning/sense chosen at block 124. The new query may be presented to a user, for example, so the user can select the query to cause the query to be submitted to the query-based system. Alternatively, the new query may be submitted without requiring user action.

The query results may be presented in a web page, a window, etc. In an embodiment in which the query is a query in an imprecise syntax, the query results reflect an attempt to provide an answer to the query. As used herein, an "answer" to a query is a reply that is based on a chosen meaning of the query that is chosen from a plurality of possible meanings. The answer provides information that is relevant to the chosen meaning of the query. This is in contrast to a typical web search engine that merely returns links to web pages that the engine has found to include terms from the query. A typical web search engine does not choose a meaning of a query from a plurality of possible meanings.

The answer may also include information that is related to the answer. For example, if the query is "population of Manhattan", the query results may include the population of Manhattan, N.Y., the population of the metropolitan area that includes Manhattan, N.Y., a map showing the location of Manhattan, N.Y. within a region that includes Manhattan, N.Y., and other information about Manhattan, N.Y. As another example, if the query is asking for a mathematical formula, the query results may include the formula and mathematical information related to the formula such as a plot of the formula, a derivative of the formula, etc.

In some embodiments, the web page or window, for example, may also include indications of other possible meanings/senses for the word. In these embodiments, the indications of other possible meanings/senses for the word may be listed in an order, such as according to an overall ranking.

There may be cases in which only one interpretation makes sense. Therefore, in one embodiment, a "minimal questioning" or a de-clashing approach may be utilized to ensure that rankings for possible meanings/senses are not computed when they are not needed.

One instance where this de-clashing approach may be applied is when making assumptions about which date format to use (day/month or month/day). If the user inputs "11/13/08" as part of his query, only one date format interpretation makes sense, since there is no thirteenth month. Therefore, the system may automatically assume a month/day format instead of using more complex methods of generating the assumption based on GeoIP.

Figure 2:
FIG. 2 is an illustration of an example display that may be utilized in an implementation of the method of FIG. 1.
Figure 3:
FIG. 3 is another illustration of the example display of FIG. 1.

FIG. 2 is an illustration of an example display 200 that may be utilized in an implementation of a method such as the method 100 of FIG. 1. The example display 200 is configured to permit a user to enter a query, such as a query in an imprecise syntax. The display 200 may be part of a web page, window, etc., for example. In FIG. 2, a query has been entered: "Manhattan." The query has been entered into a text box 204 by a user. In response, an assumption as to the meaning/sense of Manhattan has been generated. In particular, it is assumed that Manhattan is a city, and that the city is in the state of New York. Thus, the assumed meaning/sense of "Manhattan" is the city of Manhattan located in New York State. The assumption is displayed in a portion 208 of the display 200. The display 200 also includes query results corresponding to the assumption. The query results are displayed in a portion 212 of the display 200. The display 200 also includes user interface mechanisms such as links and pull down menus to permit the user to change the assumption. For example, there are links 216 to permit the user to change the assumed entity from a city to an island, bridge, periodical, or movie. There is a link 220 to change the assumed entity from Manhattan, N.Y. to Manhattan, Kans. Additionally, there is a pull-down menu user interface mechanism 224 to permit a user to change the assumed entity to one of a plurality of other cities. FIG. 3 is an illustration of the display 200 in which a pull down menu 228 has been activated using the user interface mechanism 224 to see other possible meanings/senses of "Manhattan", assuming the entity is a city.

Figure 4:
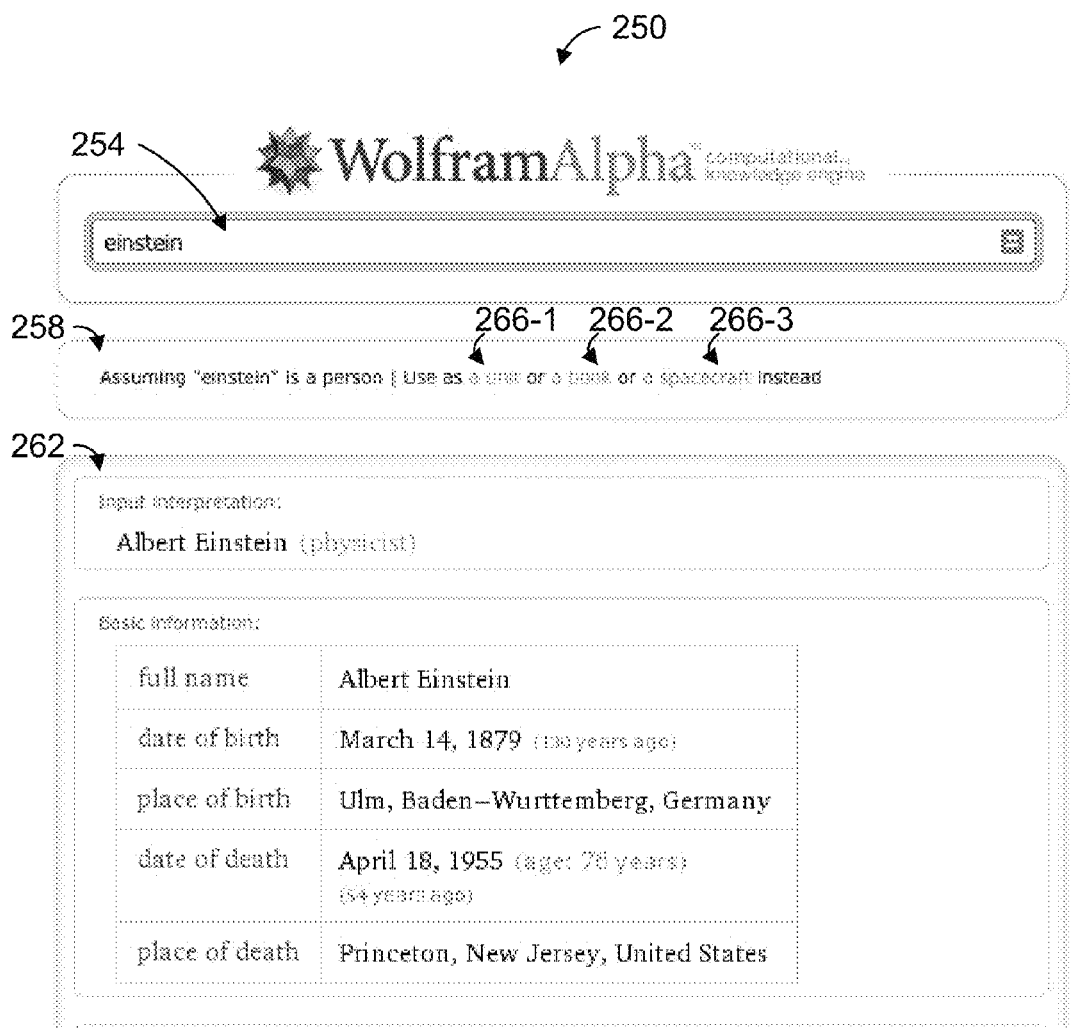
FIG. 4 is an illustration of another example display that may be utilized in an implementation of the method of FIG. 1.

FIG. 4 is an illustration of an example display 250 that may be utilized in an implementation of a method such as the method 100 of FIG. 1. The example display 250 is configured to permit a user to enter a query, such as a query in an imprecise syntax. The display 250 may be part of a web page, window, etc., for example. In FIG. 4, a query has been entered: "einstein." The query has been entered into a text box 254 by a user. In response, an assumption as to the meaning/sense of "einstein" has been generated. In particular, it is assumed that "einstein" is a person, and the assumed meaning/sense of "einstein" is the physicist Albert Einstein. The assumption is displayed in a portion 258 of the display 250. The display 250 also includes query results corresponding to the assumption. The query results are displayed in a portion 262 of the display 250. The display 250 also includes user interface mechanisms such as links to permit the user to change the assumption. For example, there are links 266 to permit the user to change the assumed entity from a person to a unit of measurement, a book, or a spacecraft.

Figure 5:
FIG. 5 is an illustration of another example display that may be utilized in an implementation of the method of FIG. 1.

FIG. 5 is an illustration of an example display 300 that may be utilized in an implementation of a method such as the method 100 of FIG. 1. The example display 300 is configured to permit a user to enter a query, such as a query in an imprecise syntax. The display 300 may be part of a web page, window, etc., for example. In FIG. 5, a query has been entered: "13/11/08." The query has been entered into a text box 304 by a user. In response, an assumption as to the meaning/sense of "13/11/08" has been generated. In particular, it is assumed that "13/11/08" is a date and the assumed meaning/sense of "13/11/08" is Nov. 13, 2008. The assumption is displayed in a portion 308 of the display 300. The display 300 also includes query results corresponding to the assumption. The query results are displayed in a portion 312 of the display 300. The display 300 also includes user interface mechanisms such as links to permit the user to change the assumption. For example, there is a link 316 to permit the user to change the assumed entity from a date to a mathematical object.

Figure 6:
FIG. 6 is an illustration of another example display that may be utilized in an implementation of the method of FIG. 1.

FIG. 6 is an illustration of an example display 350 that may be utilized in an implementation of a method such as the method 100 of FIG. 1. The example display 350 is configured to permit a user to enter a query, such as a query in an imprecise syntax. The display 350 may be part of a web page, window, etc., for example. In FIG. 6, a query has been entered: "springfield." The query has been entered into a text box 354 by a user. In response, an assumption as to the meaning/sense of "Springfield" has been generated. In particular, it is assumed that "Springfield" is a city, and the assumed meaning/sense of "springfield" is the Springfield, Ill. The assumption is displayed in a portion 358 of the display 350. The display 350 also includes query results corresponding to the assumption. The query results are displayed in a portion 362 of the display 350. The display 350 also includes user interface mechanisms such as links and a pull down menu to permit the user to change the assumption. For example, a user interface mechanism 370 permits a user to display a pull down menu 374 that lists other cities so that the user can change the assumed city.

In one embodiment, the method 100 may be incorporated into a system such as the example systems described U.S. patent application Ser. No. 11/852,044, filed on Sep. 7, 2007, and entitled "Methods and Systems for Determining and Processing Formulas," which is hereby expressly incorporated by reference herein. A module or modules for choosing a meaning/sense of a word may be added to the system or incorporated into one of the blocks illustrated in FIG. 11 of U.S. patent application Ser. No. 11/852,044.

Figure 7:
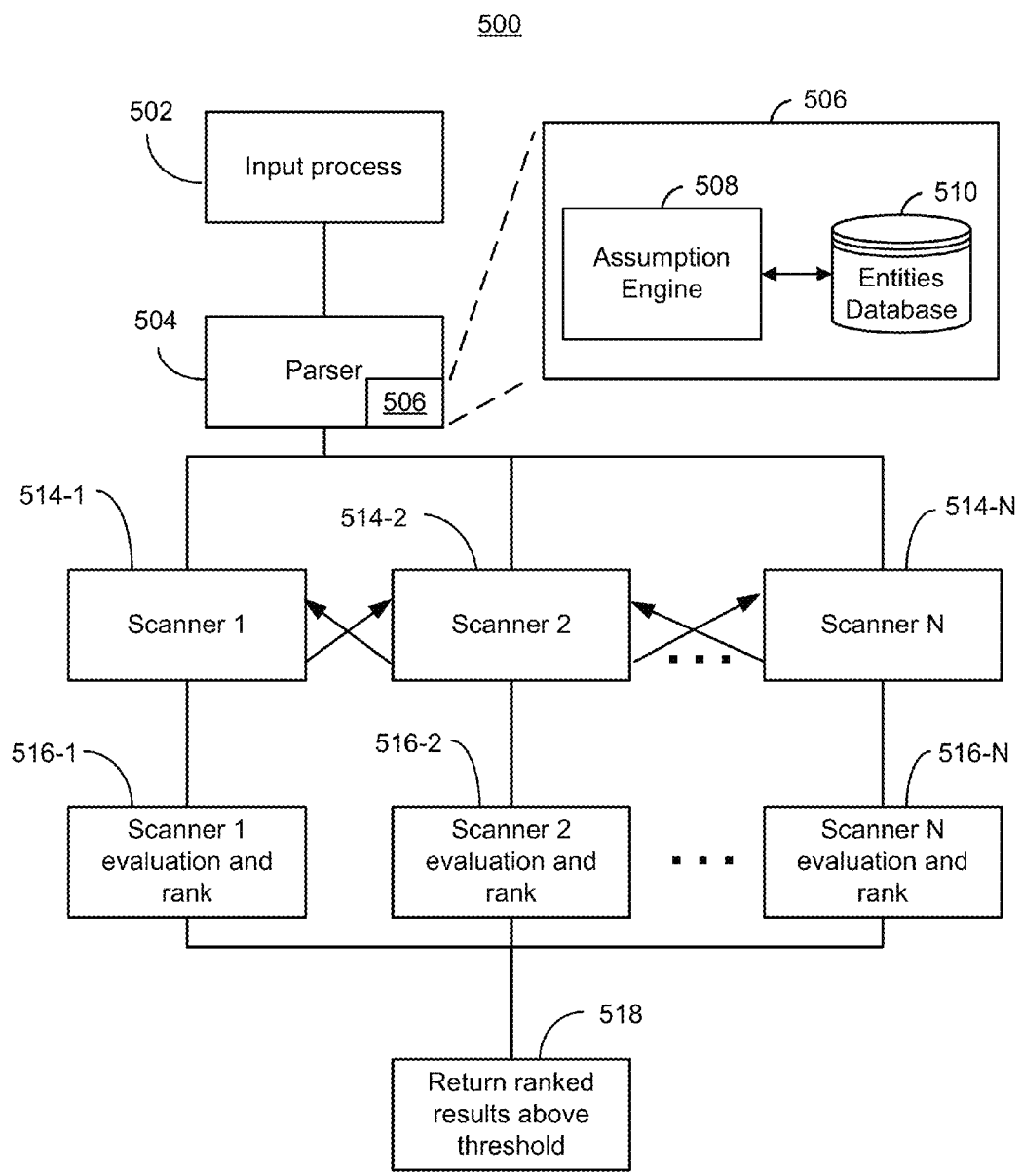
FIG. 7 is a block diagram of an example system for answering queries in an imprecise syntax.

Referring now to FIG. 7 of the present application, a block diagram illustrates an example system 500 that may be used to implement one or more of the example methods described previously. Of course other systems may also be used to implement those methods. The system 500 may be a stand-alone executable application with its own user interface. Also, the system 500 could be an added feature or subsystem of a larger application such as a computational application (e.g., the MATHEMATICA® software system available from Wolfram Research, Inc., a spreadsheet application, etc.). For example, the system 500 could be part of a "help" subsystem within a larger application. Additionally, the system 500 could be an applet accessed via a website, for example. Further, the system 500 may also be implemented as a Web service with a Web browser implementing the user interface in a known manner. For example, the system 500 could be browser plug-in or toolbar system. The system 500 may include an input process 502 for receiving data from a user. The input process 502 may receive input in an imprecise syntax. The input process 502 may also provide elementary error and consistency checking, for example, to help ensure that at least some characters are present or prompting the user with an error when a length limit is exceeded.

The system 500 may also include a parser 504 communicatively coupled to the input process 502. The parser 504 may examine the input to extract keywords, group words into phrases, identify numerical expressions, categorize data, etc., for example. The parser 504 may perform an initial go/no go analysis on the keywords, phrases, or numerical expressions to determine if there is enough information to proceed to a further step. When there is not enough information to make even a cursory pass at further analysis, the parser 504 may cause the user to be prompted for additional information such as information that may clarify the formula desired by the user. Alternatively, the system 500 may return the input unchanged along with a message that it cannot interpret the input.

In one implementation, the parser 504 may take an initial input and create tokens, and then assemble the tokens into one or more expressions in a precise syntax. In other words, the parser 504 may generally take input data in an imprecise syntax and generate expressions in a precise syntax. As an example, if a user enters the text "sin[x]<0.5", the parser 504 may create a plurality of tokens: "sin", "[x]", "<", and "0.5", where "sin" is recognized as a function name, "[x]" is recognized as a variable name, "<" is recognized as an inequality, and "0.5" is recognized as a real number. Then, the parser 504 may generate an expression in a precise syntax using these tokens.

Optionally, the parser 504 may perform additional processing. For example, the parser may attempt to identify phrases. Additionally, the parser 504 may attempt to rearrange tokens to see if the rearrangements match something that the parser 504 understands, such as a phrase. For instance, the parser 504 may utilize algorithmic rearrangements of the input. Also, the parser 504 may cause the user to be prompted to rephrase the input. Then, the parser 504 may analyze the original input in conjunction with the rephrased input. Further, the parser 504 may utilize machine learning techniques to identify language processing algorithms that work better than others.

In one embodiment, the parser 504 includes an assumption system 506. The assumption system 506 includes an assumption engine 508 and includes or is coupled to an entities database 510. In an embodiment, the assumption system 506 implements blocks 108, 112, 116, 120, and 124 of FIG. 1. In other embodiments, the assumption system 506 implements one or more blocks similar to one or more of the blocks 108, 112, 116, 120, 124 and/or omits one or more of blocks 108, 112, 116, 120. In still other embodiments, the assumption system 506 implements another suitable method for determining assumptions to be made about words, phrases, groups of textual characters, etc.

In one embodiment, the assumption system 506 provides an indication of an assumption for each word or phrase that the assumption system 506 recognizes. In an embodiment, the assumption system 506 is able to recognize words and phrases that are stored in the entities database 510. For example, the assumption engine 508 may search for words, phrases, groups of textual characters, etc., that are stored in the entities database 510 and correspond to entities known by the system 500. The entities database 510, in an embodiment, is a structured database storing entities organized into categories, sub-categories, etc. In one embodiment, the entities database 510 stores attributes of entities. For example, an entity "hamburger' may be a subcategory of "Food". A "hamburger" may have attributes such as size (large patty, regular patty, small patty), patty count (one, two, etc.), variety (plain, with condiments, etc.). In some embodiments, an entity can belong to multiple categories, sub-categories, etc. For example, a hamburger could be categorized as "Food" and also categorized as "Fast Food", which is a sub-category of Food.

The indication of the assumption may be a keyword. As an example, the word "pi" can refer to different things, like the name of the well-known mathematical constant (π) or the name of the movie "pi". If the assumption system 506 makes the assumption that the word "pi" is referring the mathematical constant, the indication of the assumption may be the keyword "NamedConstant" or some other suitable keyword. If the assumption system 506 makes the assumption that the word "pi" is referring the movie, the indication of the assumption may be the keyword "Movie" or some other suitable keyword.

The indication of an assumption for a word, a phrase, a group of textual characters, etc., is associated with the word, the phrase, the group of textual characters, etc., so that the system 500 can determine to which word, phrase, group of textual characters, etc., the assumption applies. The indication is associated with the word, the phrase, the group of textual characters, etc., using a precise syntax known to the system 500.

As another example, the letter "m", standing alone or in combination with other characters such as "/" may refer to units of meters or minutes. If the assumption system 506 makes the assumption that "m" is referring to units of meters, the indication of the assumption may be the keywords "Unit" and "Meters" or some other suitable keywords. The keywords "Unit" and "Meters" may be associated to indicate that "Meters" is a subtype of "Units". If the assumption system 506 makes the assumption that "m" is referring units of minutes, the indication of the assumption may be the keyword. "Unit" and "Minutes" or some other suitable keywords. The keywords "Unit" and "Minutes" may be associated to indicate that "Minutes" is a subtype of "Units".

As another example, the word "integrate" may refer to the word that means to unite or it may refer to the mathematical integral function. If the assumption system 506 makes the assumption that "integrate" is referring to the mathematical function, the indication of the assumption may be the keyword "Function" or some other suitable keyword.

As another example, the word "hamburger" may refer to the food hamburger, or more specifically to a hamburger from McDonald's®, a hamburger from Burger King®, etc. If the assumption system 506 makes the assumption that "hamburger" is referring to the basic hamburger, the indication of the assumption may be the keywords "Food" and "Hamburger" or some other suitable keywords. The keywords "Food" and "Hamburger" may be associated to indicate that "Hamburger" is a subtype of "Food". If the assumption system 506 makes the assumption that "hamburger" is referring to a hamburger from McDonald's®, the indication of the assumption may be the keywords "Food" and "McDonaldsHamburger" or some other suitable keywords. The keywords "Food" and "McDonaldsHamburger" may be associated to indicate that "McDonaldsHamburger" is a subtype of "Food". If the assumption system 506 makes the assumption that "hamburger" is referring to a hamburger from Burger King®, the indication of the assumption may be the keywords "Food" and "BurgerKingHamburger" or some other suitable keywords. The keywords "Food" and "BurgerKingHamburger" may be associated to indicate that "BurgerKingHamburger" is a subtype of "Food".

As another example, the input "3:00" may refer to either an AM time or a PM time. If the assumption system 506 makes the assumption that "3:00" is referring to an AM time, the indication of the assumption may be the keyword "am" or some other suitable keyword. Similarly, if the assumption system 506 makes the assumption that "3:00" is referring to a PM time, the indication of the assumption may be the keyword "pm" or some other suitable keyword.

As another example, the input "12/11/1996" may refer to either Dec. 11, 1996 or Nov. 12, 1996. In other words, the format may be month/day/year or day/month/year. If the assumption system 506 makes the assumption that the format is month/day/year, the indication of the assumption may be the keyword "MonthDayYear" or some other suitable keyword. Similarly, if the assumption system 506 makes the assumption that the format is day/month/year, the indication of the assumption may be the keyword "DayMonthYear" or some other suitable keyword.

As another example, with a query that contains elements separated by spaces, it may be ambiguous whether the input is to be interpreted as a multiplication of elements or a list of elements. For example, the query "3 x" could be interpreted as 3*x, but it could also be the list {3, x}. If the assumption system 506 makes the assumption that elements separated by a space or spaces is a multiplication of the elements, the indication of the assumption may be the keyword "Times" or some other suitable keyword. Similarly, if the assumption system 506 makes the assumption that elements separated by a space or spaces is a list of elements, the indication of the assumption may be the keyword "List" or some other suitable keyword.

As another example, with a query that contains elements separated by a comma, it may be ambiguous whether the input is to be interpreted as a number with a comma for a thousands separator or a list of elements. For example, the query "1,234" could be interpreted as the number one thousand two hundred and thirty four, but it could also be the list {1, 234}. If the assumption system 506 makes the assumption that two elements separated by a comma is a number, the indication of the assumption may be the keyword "Number" or some other suitable keyword. Similarly, if the assumption system 506 makes the assumption that elements separated by a comma is a list of elements, the indication of the assumption may be the keyword "List" or some other suitable keyword.

As another example, with a query that contains a number having only zeros and ones, it may be ambiguous whether the input is to be interpreted as a binary number or a base 10 number. For example, the query "100110101" could be interpreted as a binary number or a base 10 number. If the assumption system 506 makes the assumption that the number is a binary number, the indication of the assumption may be the keyword "Binary" or some other suitable keyword. Similarly, if the assumption system 506 makes the assumption that the number is a base 10 number, the indication of the assumption may be the keyword "Decimal" or some other suitable keyword.

As another example, with a query that contains a series of letters, it may be ambiguous whether the input is referring to a DNA sequence. For example, the query "AGGGAAAA" could be interpreted as a DNA sequence. If the assumption system 506 makes the assumption that an input is a DNA sequence, the indication of the assumption may be the keyword "DNA" or some other suitable keyword.

One or more indicators of one or more assumptions made by the assumption system 506 may be included in one or more expression in a precise syntax generated by the parser 504. For example, if keywords are utilized for indicating assumptions, an expression generated by the parser 504 may include the keywords, and the keywords are associated with respective words, phrases, groups of textual characters, etc., to indicate to which words, phrases, groups of textual characters, etc., the assumptions correspond.

In an embodiment, the assumption system 506 also generates indicators of one or more additional assumptions that can be made about a word, phrase, group of textual characters, etc. These indicators may be used by the system 500 to permit a user to change assumptions made by the system 500.

The one or more expressions generated by the parser 504 may be provided to one or more scanners 514 that may each have a particular focus. For example, scanner 514-1 may be directed to developing a graphical plot for numerical expressions or phrases parsed from the input that can be reduced to a plot. As an example, if an input includes an expression, such as $x^2$, scanner 514-1 may develop and output a plot of $x^2$ (i.e., a parabola). As another example, if the expression is Sin[x] <0.5, scanner 514-1 may develop and output a plot of values of x that satisfy this expression. Other scanners 514 may have other specific specializations, such as evaluating equations, determining roots, evaluating integrals, evaluating derivatives, determining relevant transforms, etc. Other specializations may include, for example, determining mathematical formulas, determining chemical formulas, determining physics formulas, determining financial formulas, determining engineering formulas, determining medical formulas, etc.

Depending upon the application, more or less scanners 514 may be utilized. For instance, if an application is to be devoted for use in a financial field, scanners related to chemical formulas may be omitted.

Some scanners 514 may generate results based on a database query. For example, a scanner 514 related to geometry formulas may query a database (such as the entities database 510 or another database) for keywords "area" and "triangle" for formulas related to those terms. As another example, a scanner 514 may query a database (such as the entities database 510 or another database) for raw data needed to evaluate an expression. For instance, an expression may include c, the speed of light, and a scanner may query a database to retrieve a numerical value for c. As another example, an expression may require statistical data, such as a population of a particular city, state, or country needed to evaluate a "per capita" expression, and the scanner 514 may query a database (such as the entities database 510 or another database) to obtain the needed data.

Other scanners 514 may generate results by synthesizing outputs. For example, a scanner 514 for generating indefinite integrals may receive a mathematical expression and synthesize the indefinite integral of that expression, rather than searching a database of pre-generated indefinite integrals. Some scanners 514 may be capable of doing database queries as well as synthesis of results. For example, the scanner 514 related to geometry formulas may generate an expression for the area of a triangle based on a database query, but may also synthesize another expression by integrating parameter values into formulas retrieved from a database.

In addition to receiving data from the parser 504, each scanner 514 may share results with each of the other scanners. Again, results generated by a scanner 514 based on the shared results may also be shared with each of the other scanners 514, and so on. This process may continue until the scanners 514 no longer have additional data to add, for example. Trivial transforms may also be recognized and blocked.

For each word or phrase that the assumption system 506 chooses a meaning/sense, the parser 504 provides information to the scanners 514 that indicates the chosen meaning/sense. For example, the parser 504 may provide keywords or other indicators of the assumptions made. The scanners 514 use the assumption information (e.g., keywords) in generating results. Additionally, the scanners 514 may obtain and utilize additional information related to the assumption using the assumption. For example, if it is assumed that the word "pi" refers to the movie, the scanners 514 can obtain and utilize other information related to the movie "pi" such as the year of its release, the name of the director, the box office receipts. The additional information related to the assumption may be stored in the entities database 510 or another database. In one embodiment, the entities database 510, or another database, stores attributes of entities stored in the entities database 510. The stored attributes of entities may provide additional information that can be utilized by the scanners 514. As an example, the entities database 510, or another database, stores movie entities and attributes of movies such as the year of release, the name of the director, the names of actors, the box office receipts, etc.

When each scanner 514 has contributed to both the original input from the parser 504 and shared input from all the other scanners 514, the results from each scanner to respective postprocessors 516. The postprocessors 516 evaluate the results and may provide a ranking of each result by assigning a value (e.g., a percentage) to each result.

The ranked results may be passed to an output module 518 which may generate an output having the results with rankings above a certain threshold, while omitting results below the threshold. The threshold may be set at a predetermined level, or may be adjusted according to the number of results and a statistical analysis of the rankings. For example, a query that produces ten thousand results may adjust the threshold to 99% relevance, thereby limiting the displayed results to the top 100. In another example though, where perhaps only a half a dozen results are returned, all the results may be displayed even though the rankings may be relatively low. The output of the output module 518 may comprise a web page, a window, etc. Examples of web pages, windows, etc., that the output module 518 may generate are shown in FIGS. 2-6.

In an embodiment, the output module 518 receives indicators of one or more additional assumptions that can be made about a word, phrase, group of textual characters, etc., from the assumption system 506. The output module 518 may utilize these indicators to provide information relating to the other assumptions that can be made and to provide user interface mechanisms that permit a user to change assumptions made by the system 500 in order to generate at least potentially different results. Referring to FIGS. 2-6, links, pull-down menus, etc., can be provided to permit a user to change assumptions made by the system 500 in order to generate at least potentially different results.

Figure 8:
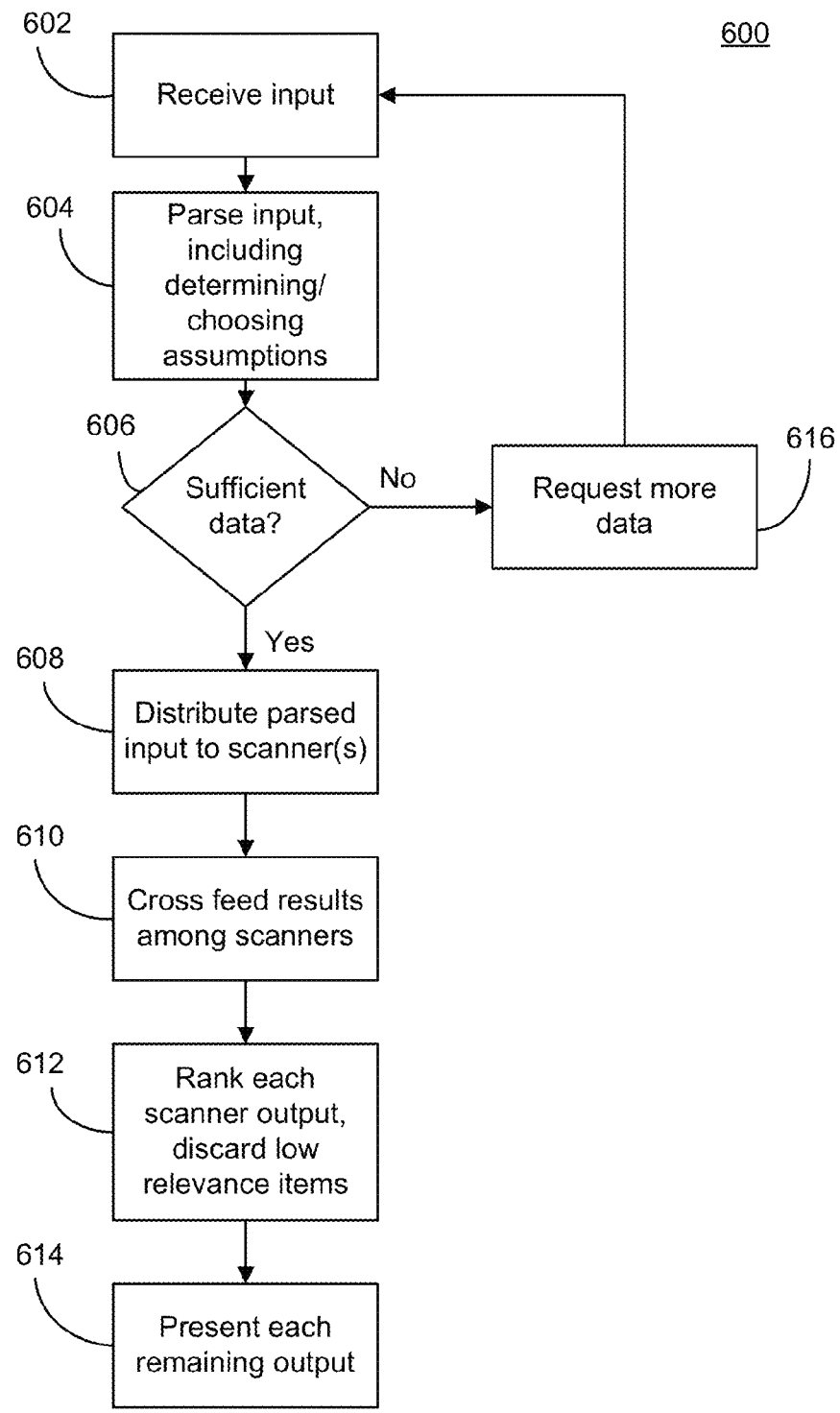
FIG. 8 is a block diagram of an example method of answering queries in an imprecise syntax.

FIG. 8 is flow diagram of an example method 600 for providing one or more answers to a user based on a query input that may be in an imprecise syntax. The method 600 will be described with reference to FIG. 7 for ease of explanation. It will be understood, however, that the method 600 may be utilized with systems other than the system 500, and that the system 500 may implement methods other than the method 600.

Input in an imprecise syntax may be received at block 602 and then parsed at block 604 to process the input. For example, the input may be analyzed to create data in a formal or precise syntax. Parsing at block 604 may include determining and choosing assumptions such as described above. When the parser 504 is able to determine a sufficient amount of data to proceed, a 'yes' branch from a block 606 maybe taken to a block 608. At the block 608, the parsed data (e.g., the output of the parser 504) may be distributed to each of the plurality of scanners 514. As described above, the parsed data may include information that indicates assumptions made regarding words and/or phrases in the parsed data. Also as described above, each scanner 514 may examine the output of the parser 504 at the block 608 for areas of specific capability with respect to that scanner 514. When a scanner 514 identifies data it can process, the scanner creates output specific to the input and then, at a block 610, the scanner 514 may share its output with each of the other scanners 514. For example, the scanner 514-1 may create a mathematical expression and that mathematical expression may be delivered to scanners 514-2 and 514-N. Scanners 514-2 and 514-N may be able to synthesize output based on the mathematical expression from scanner 514-1 that they were not able to process from the direct input from the parser 504. The scanners 514 may utilize the assumption information and may utilize information related to the assumptions such as characteristics or attributes of an assumed entity.

When each scanner 514 can no longer synthesize meaningful output, the results may be passed to the output module 518 at a block 612. At the block 612, each output may be ranked in terms of relevance. Output elements of low relevance optionally may be discarded. At a block 614, output elements that were not discarded at the block 612 may be presented to the user. Output elements may be presented in rank order, or in the case of more common output elements, in a standard presentation format.

When the parser 504 cannot process the input, the 'no' branch from the block 606 may be taken to block 616 and the user may be prompted for more information. Alternatively, the user may be prompted that the input cannot be interpreted and the flow may return to the block 602 to receive a next input.

Figure 9:
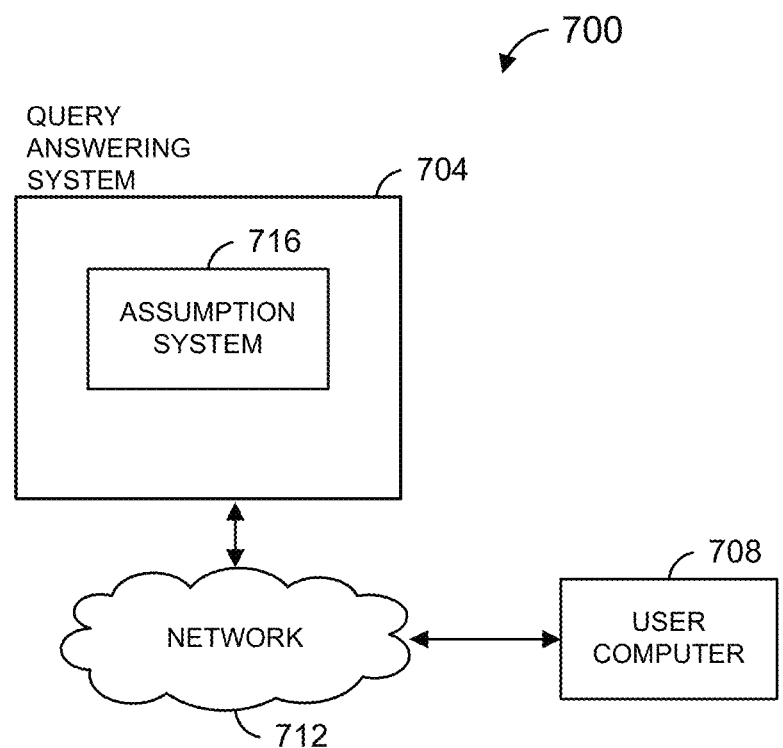
FIG. 9 is a block diagram of an example system for answering queries in an imprecise syntax.

FIG. 9 is block diagram of an example system 700 that includes a query answering system 704 for answering queries in imprecise syntax. The query answering system 704 generates answers to queries as opposed to merely providing links to web pages having words that match words in the query. In other words, the query answering system 704 attempts to understand the meaning of the query and then provides an answer to the query based on the understood meaning. For example, in response to the query "manhattan", the query answering system 704 may determine that "manhattan" can refer to various entities such as the city in New York, various other cities in the United States, the movie "Manhattan", etc. The different entities correspond to different assumptions regarding the meaning of the word "manhattan". The query answering system 704 may then chooses one of assumptions, i.e., chooses an entity, and determines information about the entity to formulate an answer. The information may be retrieved from a database of the query answering system 704 or a database communicatively coupled to the query answering system 704. The determined information is then returned and provided by the query answering system 704 in response to the query.

The system 700 includes a user computer 708 coupled to the query answering system 704 via a communications network 712. The communications network 712 may include a local area network (LAN), a wireless LAN, a wide area network (WAN), a mobile communications network, the Internet, etc.

A user enters a query via the user computer 708. For example, the user may enter a query via a web page or other display that is displayed on a display device of the user computer 708. The user computer 708 then transmits the query to the query answering system 704 via the network. The query answering 704 includes an assumption system 716 that determines and chooses assumptions regarding words, phrases, groups of textual characters, etc., in the query. In an embodiment, the query answering system 704 is implemented on a computer such as a server, a workstation, a mainframe, etc. The query answering system 704 may be a system such as the system 500 of FIG. 7 or another suitable system. The assumption system 716 may include the assumption system 506 of FIG. 7 or another suitable system. The user computer 708, in various embodiments, is a personal computer, a tablet computer, a smart phone, a personal digital assistant (PDA). Each of the device 704 and the device 708 include respective network interfaces to transmit and receive data via the network 712.

An answer to the query, based on assumptions determined and chosen by the assumption system 716, is transmitted by the answering system 704 via the network 712. The answer may be included in a web page or other suitable display, which is displayed on the display device of the user computer 708. In an embodiment, the answering system 704 also transmits indications of the assumptions chosen by the assumption system 716, and transmits these indications via the network 712. In an embodiment, the answering system 704 also transmits indications of other assumptions determined by the assumption system 716, and transmits these indications of other assumptions via the network 712. The indications of the chosen assumptions and/or other determined assumptions are displayed on the display device of the user computer 708. Such displays may include user interface mechanisms (e.g., links, pull-down menus, etc.) to permit a user to select a different assumption using the user computer 708. If the user selects a different assumption, an indication of the selection is transmitted by the user computer 708 to the answering system 704 via the network. In response to receiving the indication of the selection, the answering system 704 determines a new answer to the user query based on the different assumption, and the answer is transmitted to the user computer 708 for display to the user.

In an embodiment, the answering system 704 implements the method 100 of FIG. 1. For example, the blocks 108, 112, 116, 120, 124 may be implemented by the assumption system 716, according to an embodiment. The answering system 704 may generate web pages or displays similar to the example displays of FIGS. 2-6.

In an embodiment, the answering system 704 receives a query in an imprecise syntax from the user computer 708, via the network 712, the query including a word, phrase, or group of textual characters. The answering system 704 determines a plurality of meanings or senses of the word, phrase, or group of textual characters, and chooses one meaning or sense. The answering system 704 then generates an answer to the query based on the one meaning or sense. Also, the answering system 704 provides a user interface mechanism to permit a user to select a different one of the plurality of meanings or senses. For example, in an embodiment, the answering system 704 provides web pages or windows similar to the example displays of FIGS. 2-6 to the user computer 708. The answering system 704 receives, from the user computer 708 via the network 712, an indication of a selected different meaning or sense selected by the user using the user interface mechanism. The answering system 704 generates a different answer based on the selected different meaning or sense, and transmits, to the user computer 708 via the network 712, an indication of the different answer.

In an embodiment, the user computer 708 transmits, via the network 712, a query in an imprecise syntax, the query including a word having multiple meanings or senses. In response, the user computer 708 receives from the answering system 704, via the network 712, query results that are based on a first meaning or sense of the word. Additionally, the user computer 708 receives from the answering system 704, via the network 712, an indication of the first meaning or sense of the word (as assumed by the answering system 704). Also, the user computer 708 receives from the answering system 704, via the network 712, a user interface mechanism to permit selection of another meaning or sense from a set of one or more meanings or senses different than the first meaning or sense. The user computer 708 displays the query results, the indication of the first meaning or sense of the word, and the user interface mechanism to permit selection of another meaning or sense on the display device of the user computer 708. For example, in an embodiment, the user computer 708 displays web pages or windows similar to the example displays of FIGS. 2-6, on a display device of the user computer 708.

Any of the techniques described above, including the blocks described with reference to FIGS. 1-9, may be implemented using a processor that executes machine readable software or firmware instructions. Such computer program instructions may control the operation of a computing device such as a desktop computer, a laptop computer, a tablet computer, a workstation, a server, a mainframe, a mobile phone (e.g., a smart phone), a telephone, a set top box, a PDA, a pager, a processing system of an electronic game, a processing system of a consumer electronics device, etc. The computing device may have a processor and a memory in which the computer program instructions may be stored. The processor is coupled to the memory and executes the computer program instructions. The computer program instructions may be written in any high level language such as the programming language used with MATHEMATICA® software systems, C, C++, C#, Java or the like or any low-level assembly or machine language. By storing computer program instructions in a memory of the computing device, the computing device is physically and/or structurally configured in accordance with the computer program instructions.

While many methods and systems have been described herein as being implemented using a processor executing machine readable instructions, they may be implemented at least partially in hardware, and may be implemented by a variety of computing systems and devices. Thus, the method blocks and system blocks described herein may be implemented in a standard multi-purpose central processing unit (CPU), a special purpose CPU, or on specifically designed hardware such as an application-specific integrated circuit (ASIC) or other hard-wired device as desired. When implemented using a processor executing machine readable instructions, the machine readable instructions may be stored in any computer readable memory such as on a magnetic disk, a laser disk (such as a compact disk (CD), a digital versatile disk (DVD)), a flash memory, a memory card, a memory stick, etc., or other storage medium, in a RAM or ROM of a computer or processor, in any database, etc. Likewise, the machine readable instructions may be delivered via any known or desired delivery method including, for example, on a computer readable memory or other transportable computer storage mechanism or over a communication channel such as a telephone line, the internet, etc. (which are viewed as being the same as or interchangeable with providing such software via a transportable storage medium).

The present disclosure has been described with reference to specific examples, which are intended to be illustrative only and not to be limiting. It will be apparent to those of ordinary skill in the art that changes, additions or deletions may be made to the disclosed examples without departing from the spirit and scope of the disclosure. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of this application.

Thus, many modifications and variations may be made in the techniques and systems described and illustrated herein without departing from the spirit and scope of the present invention. Accordingly, it should be understood that the methods and systems described herein are illustrative only and are not limiting upon the scope of the invention.

What is claimed is:

1. A method, comprising:
    receiving, at one or more computing devices, a query that includes a word having multiple meanings, having multiple senses, or that corresponds to multiple entities;
    when the word is not recognized by the one or more computing devices:
        determining, based at least in part on relative placement of alphabetic characters, numeric characters, and non-alphanumeric characters of the word, one or more entities to which the word corresponds, or
        choosing, based at least in part on the relative placement of alphabetic characters, numeric characters, and non-alphanumeric characters of the word, one meaning or sense;
    when the word is recognized by the one or more computing devices and the word refers to multiple entities, determining, with one or more computing devices, the entities to which the word corresponds;
    when the word corresponds to multiple entities in a same category, ranking, with one or more computing devices, the multiple entities in the same category to which the word corresponds using a set of attributes common to entities in the category, wherein the set of attributes is different than other sets of attributes common to entities in other categories;
    when the word is recognized by the one or more computing devices and the word has multiple meanings or senses, ranking, with one or more computing devices, the multiple meanings or senses of the word based on attributes of a user;
    when the word is recognized by the one or more computing devices and the word has multiple meanings or senses, ranking, with one or more computing devices, one or more meanings or senses of the word based on a measure of popularity of the one or more meanings or senses;
    when the word corresponds to multiple entities in a same category, or the word is recognized by the one or more computing devices and the word has multiple meanings or senses, choosing, with one or more computing devices, one meaning or sense based on the rankings; and
    generating, with one or more computing devices, either:
        a new query and query results based on the one meaning or sense, or
        query results based on the one meaning or sense.

2. The method according to claim 1, wherein the new query includes information to indicate the one meaning or sense.

3. The method according to claim 2, wherein the information to indicate the one meaning or sense is a keyword that indicates the one meaning or sense.

4. The method according to claim 1, wherein the query results include information to indicate the one meaning or sense.

5. The method according to claim 1, further comprising determining one or more additional meanings or senses based on the rankings.

6. The method according to claim 5, wherein the query results include information to indicate the one or more additional meanings or senses.

7. The method according to claim 5, further comprising:
    providing a user interface mechanism to permit a user to select one of the one or more additional meanings or senses;
    receiving an indication of a selected additional meaning or sense selected by the user using the user interface mechanism; and
    generating a new query based on the selected additional meaning or sense and/or returning query results based on the selected additional meaning or sense.

8. The method according to claim 5, further comprising generating a web page that includes:
    an indication of the one meaning or sense,
    the query results based on the one meaning or sense, and
    indications of the one or more additional meanings or senses.

9. A tangible, non-transitory storage medium having stored thereon machine executable instructions, the machine executable instructions, when executed by one or more machines, cause the one or more machines to:
    receive a query that includes a word having multiple meanings, having multiple senses, or that corresponds to multiple entities;
    when the word is not recognized by the one or more machines:
        determine, based at least in part on relative placement of alphabetic characters, numeric characters, and non-alphanumeric characters of the word, one or more entities to which the word corresponds, or
        choose, based at least in part on the relative placement of alphabetic characters, numeric characters, and non-alphanumeric characters of the word, one meaning or sense;
    when the word is recognized by the one or more machines and the word refers to multiple entities, determine the entities to which the word corresponds;
    when the word corresponds to multiple entities in a same category, rank the multiple entities in the same category to which the word corresponds using a set of attributes common to entities in the category, wherein the set of attributes is different than other sets of attributes common to entities in other categories;
    when the word is recognized by the one or more machines and the word has multiple meanings or senses, rank the multiple meanings or senses of the word based on attributes of a user;
    when the word is recognized by the one or more computing devices and the word has multiple meanings or senses, rank one or more meanings or senses of the word based on a measure of popularity of the one or more meanings or senses;
    when the word corresponds to multiple entities in a same category, or the word is recognized by the one or more machines and the word has multiple meanings or senses, choose one meaning or sense based on the rankings; and generate either:

a new query and query results based on the one meaning or sense, or query results based on the one meaning or sense.

10. A method, comprising:

transmitting, via a network to a query answering system, a query in an imprecise syntax, the query including a word having multiple meanings or senses;

receiving, via the network, query results that are based on a first meaning or sense of the word, wherein:

when the word is not recognized by the query answering system, the query answering system:

determines, based at least in part on relative placement of alphabetic characters, numeric characters, and non-alphanumeric characters of the word, one or more entities to which the word corresponds, or chooses, based at least in part on the relative placement of alphabetic characters, numeric characters, and non-alphanumeric characters of the word, the first meaning or sense;

when the word is recognized by the query answering system and the word refers to multiple entities, the query answering system determines, with one or more computing devices, the entities to which the word corresponds;

when the word corresponds to multiple entities in a same category, the query answering system ranks, with one or more computing devices, the multiple entities in the same category to which the word corresponds using a set of attributes common to entities in the category, wherein the set of attributes is different than other sets of attributes common to entities in other categories;

when the word is recognized by the query answering system and the word has multiple meanings or senses, the query answering system ranks, with one or more computing devices, the multiple meanings or senses of the word based on attributes of a user;

when the word is recognized by the query answering system and the word has multiple meanings or senses, the query answering system ranks, with one or more computing devices, one or more meanings or senses of the word based on a measure of popularity of the one or more meanings or senses; and when the word corresponds to multiple entities in a same category, or the word is recognized by the query answering system and the word has multiple meanings or senses, the query answering system chooses, with one or more computing devices, the first meaning or sense based on the rankings;

receiving, via the network, an indication of the first meaning or sense of the word, wherein the first meaning or sense corresponds to an entity in a category;

receiving, via the network, a user interface mechanism to permit selection of another meaning or sense from a set of one or more meanings or senses different than the first meaning or sense; and displaying the query results, the indication of the first meaning or sense of the word, and the user interface mechanism to permit selection of another meaning or sense on a display device, wherein a list of entities in the same category to which the word corresponds are displayed in an order according to a set of attributes common to entities in the category, wherein the set of attributes is different than other sets of attributes common to entities in other categories.

11. The method according to claim 10, further comprising:
receiving, via the network, a user interface mechanism to request further query results based on the selected another meaning or sense; and displaying the user interface mechanism user interface mechanism to request a further query results on the display device.

12. The method according to claim 10, wherein the user interface mechanism is for requesting further query results based on the selected another meaning or sense.

13. The method according to claim 10, further comprising:
selecting, using the user interface mechanism, another meaning or sense from the set of one or more meanings or senses different than the first meaning or sense;

transmitting, via the network, an indication of the selected another meaning or sense;

receiving further query results based on the selected another meaning or sense.

14. A tangible, non-transitory storage medium having stored thereon machine executable instructions, the machine executable instructions, when executed by one or more machines, cause the one or more machines to:

cause a query to be transmitted via a network to a query answering system, wherein the query is in an imprecise syntax and includes a word having multiple meanings or senses;

receive query results that are based on a first meaning or sense of the word in response to the query, wherein:

when the word is not recognized by the query answering system, the query answering system:

determines, based at least in part on relative placement of alphabetic characters, numeric characters, and non-alphanumeric characters of the word, one or more entities to which the word corresponds, or chooses, based at least in part on the relative placement of alphabetic characters, numeric characters, and non-alphanumeric characters of the word, the first meaning or sense;

when the word is recognized by the query answering system and the word refers to multiple entities, the query answering system determines, with one or more computing devices, the entities to which the word corresponds;

when the word corresponds to multiple entities in a same category, the query answering system ranks, with one or more computing devices, the multiple entities in the same category to which the word corresponds using a set of attributes common to entities in the category, wherein the set of attributes is different than other sets of attributes common to entities in other categories;

when the word is recognized by the query answering system and the word has multiple meanings or senses, the query answering system ranks, with one or more computing devices, the multiple meanings or senses of the word based on attributes of a user;

when the word is recognized by the query answering system and the word has multiple meanings or senses, the query answering system ranks, with one or more computing devices, one or more meanings or senses of the word based on a measure of popularity of the one or more meanings or senses; and when the word corresponds to multiple entities in a same category, or the word is recognized by the query answering system and the word has multiple meanings or senses, the query answering system chooses, with one or more computing devices, the first meaning or sense based on the rankings;

receive an indication of the first meaning or sense of the word in response to the query, wherein the first meaning or sense corresponds to an entity in a category;

receive a user interface mechanism to permit selection of another meaning or sense from a set of one or more meanings or senses different than the first meaning or sense in response to the query; and cause the query results, the indication of the first meaning or sense of the word, and the user interface mechanism to be displayed on a display device, wherein a list of entities in the same category to which the word corresponds are displayed in an order according to a set of attributes common to entities in the category, wherein the set of attributes is different than other sets of attributes common to entities in other categories.

15. A method, comprising:

receiving, at one or more computing devices, a query in an imprecise syntax, the query including a word, phrase, or group of textual characters;

when the word, phrase, or group of textual characters is not recognized by the one or more computing devices:
  determining, based at least in part on relative placement of alphabetic characters, numeric characters, and non-alphanumeric characters of the word, phrase, or group of textual characters, a plurality of entities to which the word corresponds, or
  choosing, based at least in part on the relative placement of alphabetic characters, numeric characters, and non-alphanumeric characters of the word, phrase, or group of textual characters, one meaning or sense;

when the word, phrase, or group of textual characters is recognized by the one or more computing devices and the word, phrase, or group of textual characters refers to a plurality of entities, determining, with one or more computing devices, the entities to which the word, phrase, or group of textual characters corresponds;

when the word, phrase, or group of textual characters corresponds to multiple entities in a same category, ranking, with one or more computing devices, the multiple entities in the same category to which the word, phrase, or group of textual characters corresponds using a set of attributes common to entities in the category, wherein the set of attributes is different than other sets of attributes common to entities in other categories;

when the word, phrase, or group of textual characters is recognized by the one or more computing devices and the word, phrase, or group of textual characters has multiple meanings or senses, ranking, with one or more computing devices, the multiple meanings or senses of the word, phrase, or group of textual characters based on attributes of a user;

when the word, phrase, or group of textual characters is recognized by the one or more computing devices and the word, phrase, or group of textual characters has multiple meanings or senses, ranking, with one or more computing devices, a plurality of meanings or senses of the word, phrase, or group of textual characters, based on a measure of popularity of the plurality of meanings or senses;

when the word, phrase, or group of textual characters corresponds to multiple entities in a same category, or the word, phrase, or group of textual characters is recognized by the one or more computing devices and the word has multiple meanings or senses, choosing, with one or more computing devices, one meaning or sense based on the rankings;

generating, with one or more computing devices, an answer to the query based on the one meaning or sense;

providing a user interface mechanism to permit a user to select a different one of the plurality of meanings or senses, wherein the user interface mechanism visually presents a list of entities in the same category to which the word, phrase, or group of textual characters corresponds in an order determined, with one or more computing devices, according to the set of attributes common to entities in the category;

receiving, at one or more computing devices, an indication of a selected different meaning or sense selected by the user using the user interface mechanism; and generating, with one or more computing devices, a different answer based on the selected different meaning or sense.

16. The method according to claim 15, further comprising generating a display to provide the answer to the query and to indicate the chosen meaning or sense.

17. The method according to claim 16, wherein the display indicates meanings or senses in the plurality of meanings or senses different than the chosen meaning or sense.

18. The method according to claim 17, wherein the display includes the user interface mechanism.

19. The method according to claim 17, wherein the display is a web page.

20. A tangible, non-transitory storage medium having stored thereon machine executable instructions, the machine executable instructions, when executed by one or more machines, cause the one or more machines to:

receive a query in an imprecise syntax, the query including a word, phrase, or group of textual characters;

when the word, phrase, or group of textual characters is not recognized by the one or more machines:
  determine, based at least in part on relative placement of alphabetic characters, numeric characters, and non-alphanumeric characters of the word, phrase, or group of textual characters, a plurality of entities to which the word corresponds, or
  choose, based at least in part on the relative placement of alphabetic characters, numeric characters, and non-alphanumeric characters of the word, phrase, or group of textual characters, one meaning or sense;

when the word, phrase, or group of textual characters is recognized by the one or more machines and the word, phrase, or group of textual characters refers to a plurality of entities, determine the entities to which the word, phrase, or group of textual characters corresponds;

when the word, phrase, or group of textual characters corresponds to multiple entities in a same category, rank the multiple entities in the same category to which the word, phrase, or group of textual characters corresponds using a set of attributes common to entities in the category, wherein the set of attributes is different than other sets of attributes common to entities in other categories;

when the word, phrase, or group of textual characters is recognized by the one or more machines and the word, phrase, or group of textual characters has multiple meanings or senses, rank the multiple meanings or senses of the word, phrase, or group of textual characters based on attributes of a user;

when the word, phrase, or group of textual characters is recognized by the one or more machines and the word, phrase, or group of textual characters has multiple meanings or senses, rank a plurality of meanings or senses of the word, phrase, or group of textual characters, based on a measure of popularity of the plurality of meanings or senses;

when the word, phrase, or group of textual characters corresponds to multiple entities in a same category, or the word, phrase, or group of textual characters is recognized by the one or more machines and the word has multiple meanings or senses, choose one meaning or sense based on the rankings;

generate an answer to the query based on the one meaning or sense;

provide a user interface mechanism to permit a user to select a different one of the plurality of meanings or senses, wherein the user interface mechanism visually presents a list of entities in the same category to which the word, phrase, or group of textual characters corresponds in an order determined according to the set of attributes common to entities in the category;

receive an indication of a selected different meaning or sense selected by the user using the user interface mechanism; and generate a different answer based on the selected different meaning or sense.

21. The method according to claim 1, further comprising:
when the word is not recognized by the one or more computing devices, generating a keyword based on an analysis of the relative placement of alphabetic characters, numeric characters, and non-alphanumeric characters of the word, wherein determining the entities to which the word corresponds or choosing one meaning or sense is based on the keyword.

22. The tangible, non-transitory storage medium according to claim 9, the machine executable instructions, when executed by the one or more machines, further cause the one or more machines to:
when the word is not recognized by the one or more machines, generate a keyword based on an analysis of the relative placement of alphabetic characters, numeric characters, and non-alphanumeric characters of the word, wherein determining the entities to which the word corresponds or choosing one meaning or sense is based on the keyword.

23. The method according to claim 10, wherein when the word is not recognized by the query answering system, the query results are determined from a keyword generated based on an analysis of the relative placement of alphabetic characters, numeric characters, and non-alphanumeric characters of the word.

24. The tangible, non-transitory storage medium according to claim 14, wherein when the word is not recognized by the query answering system, the query results are determined from a keyword generated based on an analysis of the relative placement of alphabetic characters, numeric characters, and non-alphanumeric characters of the word.

25. The method according to claim 15, further comprising:
when the word, phrase, or group of textual characters is not recognized by the one or more computing devices, generating a keyword based on an analysis of the relative placement of alphabetic characters, numeric characters, and non-alphanumeric characters of the word, phrase, or group of textual characters, wherein determining the plurality of meanings or senses is based on the keyword.

26. The tangible, non-transitory storage medium according to claim 20, the machine executable instructions, when executed by the one or more machines, further cause the one or more machines to:
when the word, phrase, or group of textual characters is not recognized by the one or more machines, generate a keyword based on an analysis of the relative placement of alphabetic characters, numeric characters, and non-alphanumeric characters of the word, wherein the one or more machines determines the plurality of meanings or senses based on the keyword.

\* \* \* \* \*